Dec. 13, 1955   R. A. McLACHLAN   2,726,687
OSCILLATING AND RECIPROCATING MECHANISM FOR SAWS
Filed April 19, 1952   3 Sheets-Sheet 1

INVENTOR
ROBERT ANGUS McLACHLAN
BY
Fetherstonhaugh & Co.
ATTORNEYS

Dec. 13, 1955  R. A. McLACHLAN  2,726,687
OSCILLATING AND RECIPROCATING MECHANISM FOR SAWS
Filed April 19, 1952  3 Sheets-Sheet 3
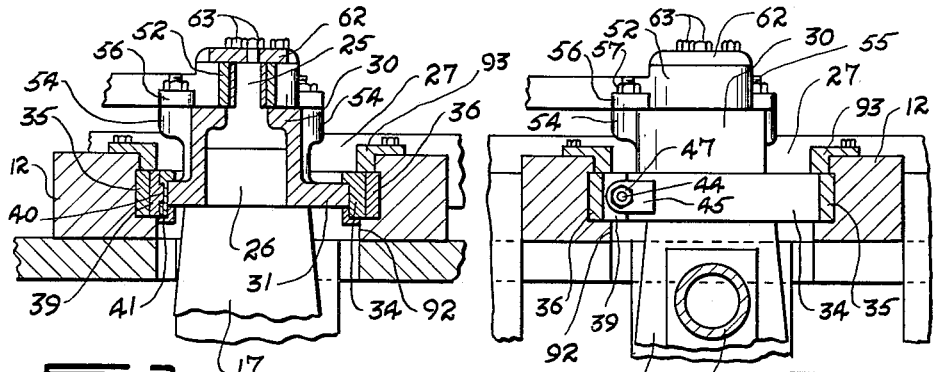
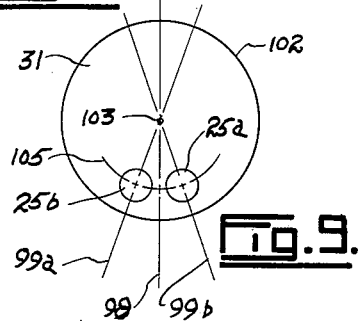
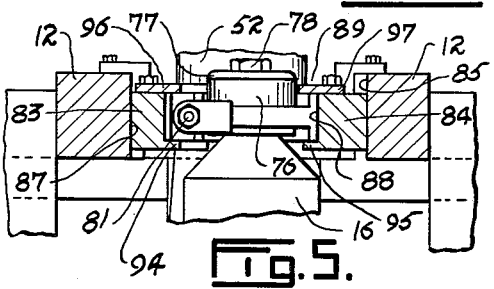
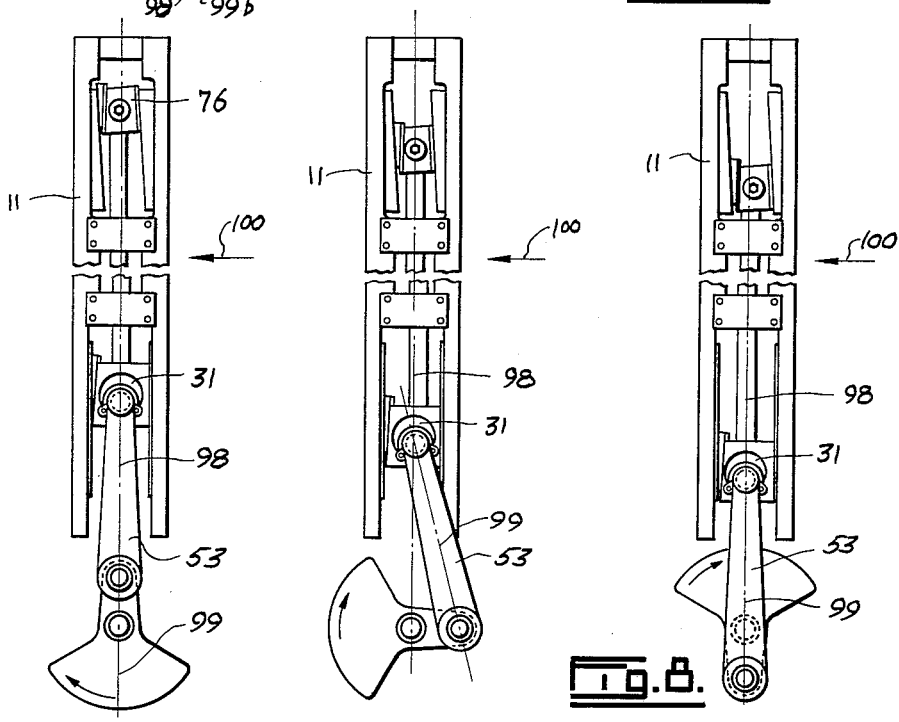
INVENTOR
ROBERT ANGUS McLACHLAN
BY
Fetherstonhaugh & Co.
ATTORNEYS

United States Patent Office 2,726,687
Patented Dec. 13, 1955

2,726,687

OSCILLATING AND RECIPROCATING MECHANISM FOR SAWS

Robert Angus McLachlan, North Vancouver, British Columbia, Canada, assignor to Dominion Bridge Company Limited, Lachine, Quebec, Canada Application April 19, 1952, Serial No. 283,162

5 Claims. (Cl. 143—81)

This invention relates to oscillating and reciprocating mechanism for saws, and particularly for saws of the type known as Swedish gang saws.

While this invention is applicable to saws having one or more cutting blades, it is particularly designed for gang saws consisting of a plurality of spaced parallel blades which are reciprocated while the log or wood to be cut is moved through them. It has been found advantageous to modify a pure reciprocating motion of the blades so that they are slightly withdrawn from the end of the cut in the log at the end of the cutting stroke.

The main object of this invention is to provide a mechanism for oscillating the one or more blades during the reciprocation thereof, said mechanism being more compact and stronger than the known devices for similar purposes, and having considerably fewer moving parts.

The present invention will hereinafter be described in connection with a gang saw, but it is to be understood that it may be applied to a saw having a single blade therein.

In Swedish gang saws, a plurality of spaced parallel saw blades are connected at their opposite ends to girders, and the latter are rigidly connected together at opposite sides of the blades by columns. The girders and columns form a frame carrying the blades, and this frame is supported and guided for substantially reciprocal motion within the main supporting frame of the saw. The reciprocal motion is usually imparted by one or more cranks mounted on a drive shaft and connected by one or more connecting rods to a portion of the saw frame. The blades are usually reciprocated in a substantially vertical plane, although they could be reciprocated in other planes if so desired.

It is desirable to provide the oscillating and reciprocating mechanism at each side of the saw frame, but as these are identical, one only will be described in detail for the sake of clarity.

A pin projects outwardly from the end of the lower girder and an eccentric circular disc is rotatably mounted thereon. This disc is rotatable within a block which is mounted in the main saw frame for reciprocal movement in a line which may be either approximately vertical or inclined at an angle to the vertical. The eccentric disc is fixedly secured to or formed with the upper end of a connecting link, said upper end being mounted to rotate around the central longitudinal axis of the pin. The opposite end is pivotally connected to the pin of a crank mounted on a drive shaft. When the vertical centre line of the crank pin coincides with the vertical centre line of the drive shaft, the vertical centre lines of the saw frame pin and of the actual centre of the eccentric disc also coincide with said centre line.

The end of the upper saw frame girder has a pin extending outwardly therefrom which may be journalled in a block mounted for reciprocal movement in a direction straight up and down or moving along a path at an angle to the vertical as in the example subsequently described. Alternatively, the pin on the end of the upper girder may have an eccentric circular disc rotatably mounted upon it in a manner similar to that described for the lower girder. This upper eccentric disc would be rotated in synchronism with the lower eccentric disc by means of coupling rods, roller chains or other suitable means.

An example of this invention is illustrated in the accompanying drawings, in which:

Figure 3 is an enlarged fragmentary section taken on the line 3—3 of Figure 1,

Figure 4 is another enlarged fragmentary section taken on the line 4—4 of Figure 1, Figure 5 is an enlarged fragmentary section taken on the line 5—5 of Figure 1, Figures 6 to 8 diagrammatically illustrate the operation of the saw, and Figure 9 is a diagram illustrating the oscillating action of this mechanism.

Figure 1:
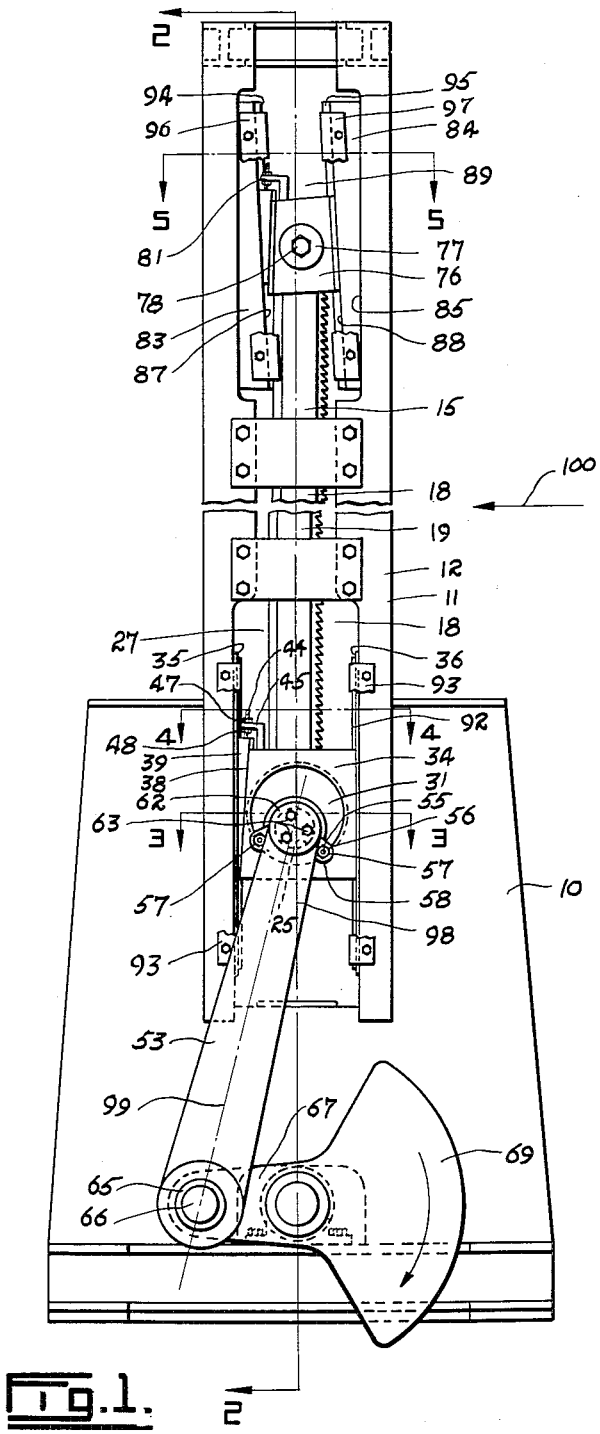
Figure 1 is a side elevation of a gang saw.
Figure 2:
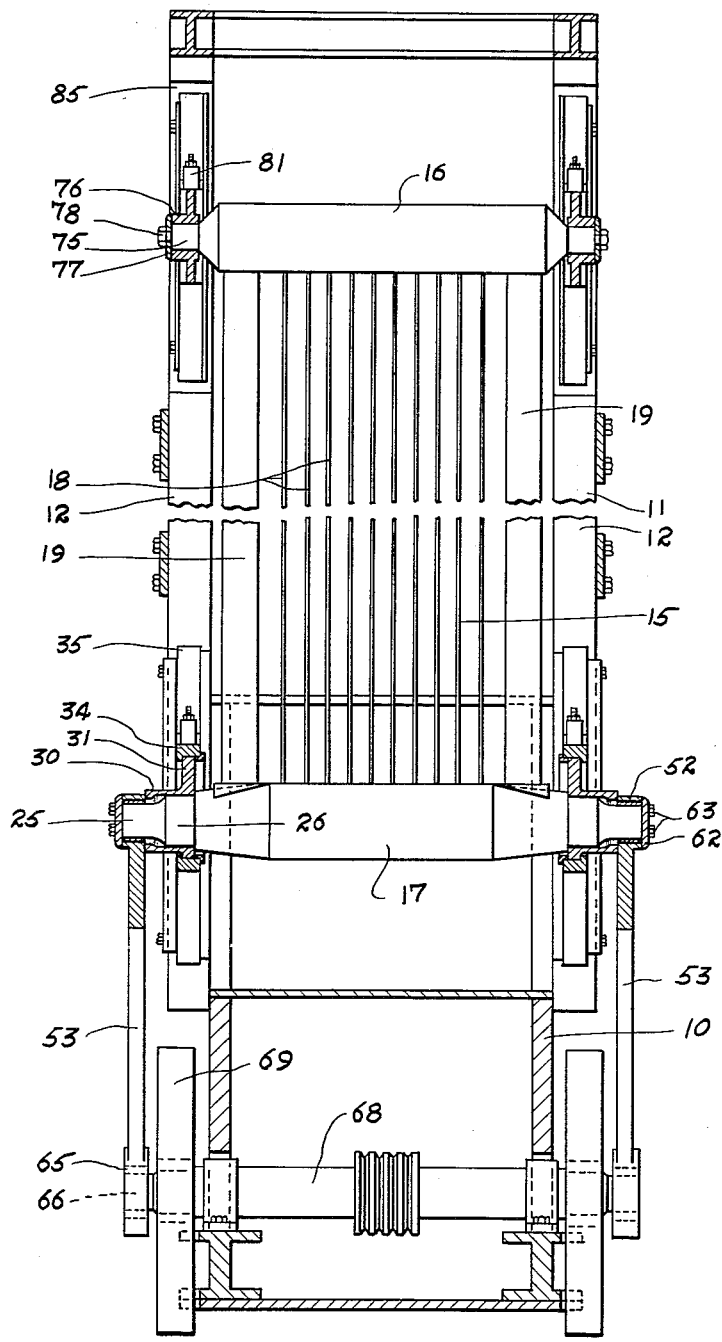
Figure 2 is a vertical section taken substantially on the line 2—2 of Figure 1.

Referring particularly to Figures 1 and 2 of the drawings, 10 is a base having a main frame 11 projecting upwardly therefrom, said frame including two spaced apart side members 12. A saw arrangement, such as a gang saw 15, is mounted for reciprocal movement between the side members of the frame. The gang saw frame consists of upper and lower girders 16 and 17 between which a plurality of spaced parallel saw blades 18 extend. Columns 19 beyond the opposite sides of the saw blades connect the girders together. These columns and the girders form a frame for the saw blades.

As the mounting of the saw frame and the mechanism for reciprocating and oscillating it is exactly the same at both sides of the machine, one side only will be described in detail.

A pin 25 projects outwardly from the end of the lower girder 17, and has an enlargement 26 adjacent the girder end. This pin projects into and through a wide slot 27 extending longitudinally of the side member 12 at the lower end thereof, see Figure 1. A sleeve 30 is rotatably mounted on the pin enlargement and is connected to an eccentric disc 31. This disc is circular in shape and is rotatably mounted within and carried by an eccentric strap block 34 which is slidably mounted within the slot 27 of the side member. Guides 35 and 36 are provided along the opposite sides of the slot along which the eccentric block is moved.

If desired, the block 34 may be provided with means for taking up wear between it and the vertical guides 35 and 36. This may be accomplished by sloping the side 38 of the block relative to the adjacent guide and inserting a wedge 39 therebetween, see Figures 1 and 3. This wedge may be provided with a tongue 40 along its inner surface fitting into a corresponding groove 41 in the block side. A threaded rod 44 projects upwardly from the wedge through a portion of an L-shaped bracket 45 connected to the top of the block. Nuts 47 and 48 may be turned on this rod to move the wedge relative to the block and to lock the former to the latter.

The sleeve 30 may be formed with, secured to, or rotatably actuated by an upper bearing 52 of a connecting rod 53. In the illustrated form of the invention, the outer end of the sleeve carries bosses 54 which are drilled to receive the inner cylindrical ends of studs 55, which are rigidly connected to a plate 56 by nuts 57, said plate being rigidly connected to or formed with the top end of the connecting rod and bearing 52.

The bearing 52 is rotatably mounted on the pin 25 and is maintained thereon in any desired manner such as by means of a cap 62 secured to the outer end of the pin by cap screws 63, said cap overlapping the bearing. The lower end of the connecting rod has a bearing 65 rotatably mounted on a pin 66 of a crank 67 carried by a drive shaft 68. A counterweight 69 may be connected to the crank and extend to the opposite side of the drive shaft. Suitable means, not shown, is provided for turning the drive shaft.

The upper girder 16 may be mounted for reciprocal movement in either (a) an approximately vertical line or (b) in a line inclined to the vertical (as in the example now being described) both in any convenient manner, or (c) an oscillating movement may be combined with the reciprocating movement in a manner similar to that described for the lower girder.

In the example herein described, the upper girder is provided with a pin 75 extending outwardly therefrom which is journalled in a bearing block 76 centrally thereof. A cap 77 may be held in position against the end of the pin by a cap screw 78 screwed into the pin end. This cap overlaps the bearing block. This block is provided at 81 with means for taking up wear similar to that described in connection with the eccentric strap block 34. As previously stated, the bearing block may be mounted for reciprocating along an approximately vertical line or along a line inclined to the vertical as in the example described. This may be accomplished by providing guides 83 and 84 in an elongated slot 85 formed in the side member 12, said guides having parallel inner surfaces 87 and 88 which are inclined to the vertical. The guide surfaces form a guide-way 89 angularly disposed relative to the vertical along which the bearing block is reciprocated.

If desired, the upper bearing block may be provided with an eccentric disc arrangement similar to that of the lower block 34 for oscillating the pin 75 and its girder. Suitable connection means, such as coupling rods, chains or the like, would have to be provided for rotating the upper disc with disc 31.

The blocks 34 and 76 are maintained against lateral movement in any desired manner. In this form of the invention, block 34 and with it the lower girder of the sawframe is restrained from lateral movement on the inside by shoulders 92 on the side member 12 and on the outside by angle strips 93 which are bolted to the side member. Block 76 is laterally restrained in a similar way. This is done on the inside, by projections 94 and 95 which are integral with the guides 83 and 84, and on the outside, by bars 96 and 97 which are cap-screwed to said guides, see Figures 1 and 4.

Figure 1 illustrates the crank on the upstroke, Figures 6 and 8 show it at top and bottom dead centres respectively, and Figure 7 shows it on the way down. In these figures, 98 is the vertical centre line passing through the centres of the eccentric disc 31 and the drive shaft 68, while the centre line 99 passes through the centres of the upper and lower bearings of the connecting rod 53. As the upper bearing is rotatably mounted on the pin 25 of the saw frame, the centre of the bearing coincides with the longitudinal axis or centre point of the pin.

Referring to Figure 6, it will be seen that when the crank is at top dead centre, the centre lines 98 and 99 coincide, and that the bearing block 76 and its pin 75 are at the upper end of their path of travel, the upper end of said path being closer to the left side of the side member 12 than the lower end thereof. The logs or lumber to be cut by the saw blades are fed therethrough in the direction of the arrow 100 in Figures 1 and 6 to 8 by suitable mechanism, not shown. When the crank starts to move downwardly, the bearing 52 is caused to rotate on the pin 25. This rotates the eccentric disc 31 in a counterclockwise direction. As the pin is eccentrically located relative to the centre of rotation of the disc, it shifts to the right of the centre line 98. This action moves the lower ends of the saws in the same direction and this is opposed to the movement of the log being cut. Figure 7 shows the pin and the saws moved closer to their extreme right hand position. As the crank shaft approaches this position, the block 76 is moved downwardly along its inclined path so that the upper ends of the saws are also moved in a direction counter to the direction of movement of the log.

Continued downward movement of the crank towards the position shown in Figure 8 rotates the eccentric disc in a clockwise direction to move the pin and the lower ends of the saw in the same direction as the movement of the log. At first this withdrawal is relatively slow, but as the crank approaches the lower dead centre, the speed of withdrawal increases so that it is faster than the movement of the log. At the same time, however, the bearing block 76 continues downwardly along its inclined path to the lower end thereof.

As the crank approaches the position shown in Figure 1 on the upstroke, the speed of withdrawal of the saw blades decreases until it stops. During this time, the upper ends of the blades are moving in the same direction of movement as the log since the bearing block is moving upwardly along its path. After the crank passes the position of Figure 1, the lower ends of the saws are moved counter to the direction of movement of the log at an increasing speed, although the upper ends are actually moving in the opposite direction. When the crank reaches the top dead centre, the cycle starts over.

The diagram of Figure 9 illustrates the movement of the pin 25. In this figure, 102 represents the outline of the eccentric disc 31, and 103 its centre point through which the vertical centre line 98 passes. The centre line of the connecting link 53 is illustrated at 99a when the crank is in the position of Figure 1, and 99b when the crank is in the position of Figure 7. When the crank pin is at the middle of its upstroke, the saw frame pin 25 is located at the position 25b and when the crank pin is at the middle of its down stroke, said frame pin is at the position 25a, the latter pin oscillating along an arcuate path 105 relative to the eccentric disc 31.

Summing this action up, the rotation of the crank reciprocates the eccentric disc through the connecting rod, and the latter rotates the disc to shift the pin and saw arrangement transversely of the path of reciprocation during the reciprocating motion thereof. The pin is oscillated on one side of the path during one reciprocating stroke and is oscillated on the other side of said path during the opposite stroke. At the same time, the pin at the opposite end of the saw arrangement and the latter are moved along a path inclined to and extending across the main reciprocating path during the reciprocating motion.

The saws cut on the downstroke, the primary movement of the saws being approximately vertically downward. During the entire downstroke, the upper ends of the saws also make a small horizontal movement counter to the direction of movement of the log. At the same time, the lower ends of the saws make first a horizontal movement counter to the direction of motion of the log, varying from a relatively rapid rate at the top of the stroke to zero at mid-stroke. This motion is then reversed to become an increasingly rapid movement in the direction of the motion of the log, attaining a maximum rate at the bottom of the stroke. During the upstroke the primary movement of the saws is approximately vertically upwards, and throughout this stroke the upper ends of the saws make a small horizontal movement in the direction of motion of the log. At the same time the bottom ends of the saws make first a small horizontal movement in the direction of motion of the log, varying from a relatively rapid rate at the bottom of the stroke, to zero at midstroke. This motion is then reversed to become an increasingly rapid horizontal movement counter to the motion of the log, attaining a maximum rate at the top of the stroke.

The effect of this movement of the saws, combined with a uniform horizontal motion of the log, is that during the downward or cutting stroke the teeth of the saws cut into the log in a slightly curved path and at a rate controlled by the rate of feed of the log. During the greater part of the upward or return stroke, the teeth of the saws are withdrawn from contact with the log. This reduces the power lost due to friction, the wear on the saw teeth, the tendency to kick the log back against the feed mechanism, and it also causes a cleaner cutting action by allowing the clearing of sawdust from the saw teeth.

As has already been stated, the movement of both upper and lower blocks may be modified from those described in the example given. These modifications are as follows:

(a) The lower block may be reciprocated along a line inclined to the vertical instead of along a vertical line, the oscillating movement being maintained. In order to do this it would only be necessary to incline the track for the lower eccentric strap block.

(b) The upper block may move along a vertical line instead of along a line inclined to the vertical.

(c) The upper girder may be provided with an eccentric disc to impart an oscillating movement similar to that described for the lower girder, the upper block on which the eccentric rotates moving either along an inclined line or a vertical line. Any of these combinations of the movements of the upper and lower girders may be made to give the most effective cutting action for the saws. The actual path of the saws will vary slightly from that described with each combination but the essential character of the movement will not be changed.

From the above it will be seen that the saw blades are simultaneously reciprocated and oscillated in a very convenient and simple manner. The mechanism causing this motion is very simple and compact and has few moving parts so that there is very little, if any, danger of it functioning improperly, and the wear is reduced to a minimum.

What I claim as my invention is:

1. In a sawing machine having a saw arrangement mounted for reciprocation in a guide frame, oscillating and reciprocating mechanism comprising an eccentric strap block mounted for reciprocation in the frame substantially parallel with the saw arrangement, a circular disc rotatably mounted in and carried by the block, a pin fixed to and projecting from a portion of the saw arrangement and journalled in the disc eccentrically of the centre of rotation of the latter, a rotatably mounted crank, a connecting rod extending from the crank to the disc, and means connecting the rod to the disc to cause said disc to rock with the rod end, whereby rotation of the crank rocks the disc to oscillate the pin and saw arrangement during reciprocation of the latter.

2. In a sawing machine having a saw arrangement mounted for reciprocating in a guide frame, oscillating and reciprocating mechanism comprising an eccentric strap block mounted for reciprocation in the frame substantially parallel with the saw arrangement, a circular disc rotatably mounted in and carried by the block, a pin fixed to and projecting from a portion of the saw arrangement, said pin being journalled in the disc eccentrically of the centre of rotation of the latter and extending therethrough, a rotatably mounted crank, a connecting rod rotatably connected at one end to the pin and at its opposite end to the crank whereby rotation of the latter reciprocates the pin and saw arrangement, and means connecting the adjacent end of the rod to the disc to cause said disc to rock with the rod end during reciprocation of the pin, whereby rotation of the crank rocks the disc to oscillate the pin and saw arrangement.

3. In a sawing machine having a saw frame including spaced girders with a plurality of saw blades extending therebetween, said saw frame being reciprocally mounted within a guide frame; oscillating and reciprocating mechanism comprising an eccentric strap block mounted for reciprocation in the guide frame substantially parallel with the saw frame, a circular disc rotatably mounted in and carried by the block, a pin fixed to and projecting from one of the girders of the saw frame, said pin being journalled in the disc eccentrically of the centre of rotation of the latter and extending therethrough, a rotatably mounted crank, a connecting rod rotatably connected at one end to the pin and at its opposite end to the crank, and means connecting the adjacent end of the rod to the disc to cause said disc to rock with the rod end, whereby rotation of the crank reciprocates the pin and rocks the disc to reciprocate and oscillate the saw frame.

4. In a sawing machine having a saw frame including spaced girders with a plurality of saw blades extending therebetween, said saw frame being reciprocally mounted within a guide frame; oscillating and reciprocating mechanism comprising an eccentric strap block mounted for reciprocation in the guide frame substantially parallel with the saw frame, a circular disc rotatably mounted in and carried by the block, a sleeve fixedly connected to and extending outwardly from the disc eccentrically of the centre of rotation of the latter, a pin fixed to and projecting from one of the girders of the saw frame, said pin being journalled in the disc and sleeve and projecting outwardly therefrom, a rotatably mounted crank, a connecting rod rotatably connected at one end to the outer end of the pin and at its opposite end to the crank, and means connecting the adjacent end of the rod to the outer end of the disc sleeve to cause said sleeve to move with the rod end, whereby rotation of the crank reciprocates the pin and rotates the disc to reciprocate and oscillate the saw frame.

5. In a sawing machine having a saw arrangement mounted for reciprocating in a guide frame, oscillating and reciprocating mechanism comprising a block mounted for vertical reciprocation in the frame substantially parallel with the saw arrangement, a circular disc rotatably mounted in and carried by the block, the axis of rotation of said disc extending horizontally and being in the path of reciprocation, a pin fixed to and projecting from a portion of the saw arrangement and journalled in the disc below the axis of rotation of the latter, the longitudinal centre of the pin being parallel with the axis of rotation of the disc and being substantially in the path of reciprocation when the block is at the top and bottom of its stroke, a rotatably mounted crank, a connecting rod rotatably connected at one end to the pin and at its opposite end to the crank whereby rotation of the latter reciprocates the pin and saw arrangement, and means connecting the adjacent end of the rod to the disc to cause said disc to rock with the rod end, said pin during reciprocation being shifted to opposite sides of the path of reciprocation.

References Cited in the file of this patent

UNITED STATES PATENTS

| Re. 9,122 | Barlow | Mar. 23, 1880 |
| 19,300 | Ketcham | Feb. 9, 1858 |
| 133,015 | Cilley | Nov. 12, 1872 |
| 231,192 | Prescott | Aug. 17, 1880 |
| 410,474 | Wickes | Sept. 3, 1889 |
| 703,924 | Holt | July 1, 1902 |
| 996,185 | Wilkin | June 27, 1911 |
| 1,485,016 | Cardullo et al. | Feb. 26, 1924 |
| 2,548,712 | Firmin | Apr. 10, 1951 |

FOREIGN PATENTS

| 681,600 | France | Feb. 3, 1930 |
| 542,143 | Germany | Jan. 20, 1932 |